Feb. 28, 1961  H. KELEM  2,972,791
CASING TIE AND MAKING SAME
Filed July 24, 1958
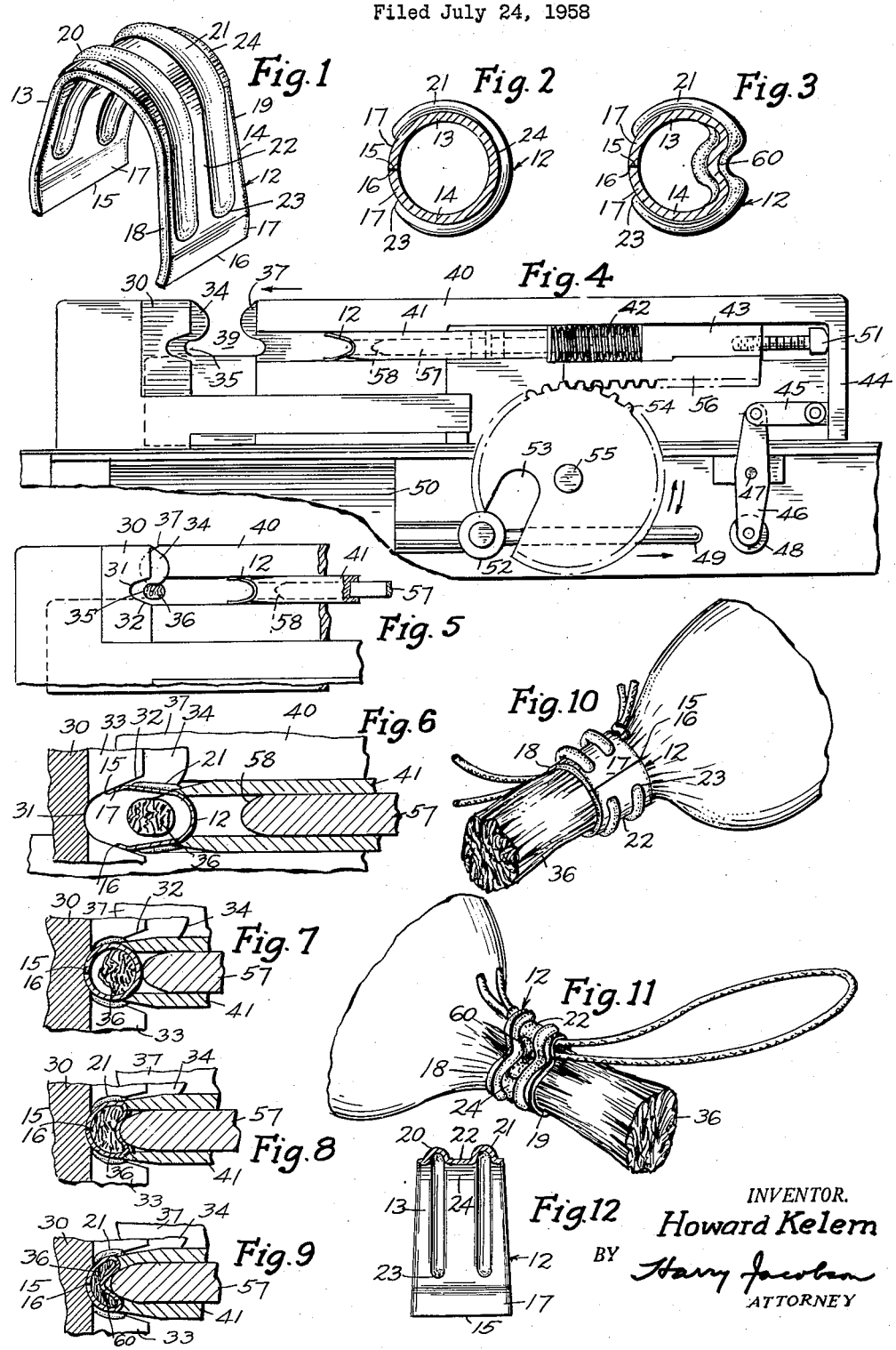
INVENTOR.
Howard Kelem
BY Harry Jacobson
ATTORNEY United States Patent Office 2,972,791
Patented Feb. 28, 1961

2,972,791
CASING TIE AND MAKING SAME

Howard Kelem, Far Rockaway, N.Y. (% Global Industrial Machinery Corp., 686 Henry St., Brooklyn 31, N.Y.)

Filed July 24, 1958, Ser. No. 750,624
9 Claims. (Cl. 24—30.5)

This invention relates to the tying and sealing of the otherwise open ends of food casings and particularly to matallic ties and the method of making such ties to provide an adequate safely sealed end on the casing.

The invention contemplates the provision of a universal adjustable tie adapted for use at the squeezed together ends of casings of various materials strengths and sizes, and which are employed to hold a large variety of food products, the tie being especially adapted to seal relatively fragile transparent casings of cellulose or the like which are easily damaged or rendered worthless by improperly applied or improperly shaped metallic fasteners.

The invention further contemplates the provision of a simple but effective method of making the tie so as effectively to seal casings of various types regardless of the material or the size thereof within a wide range without danger of exerting such excessive pressure on a relatively fragile casing as to start a scratch, bruise, cut, pinhole, break or similar damage which might ultimately result in destruction of the tie and of the casing, the tying pressure being halted when adequate sealing pressure is attained.

The invention further contemplates the provision of a universal, initially U-shaped metallic fastener having rounded edges and surfaces throughout except for the plane end edge surfaces of each leg, the end edges being adapted to be brought together into pressed contact when the fastener is loosely applied to a twisted or pleated casing end and bent into cylindrical form, the abutting end edges being maintained in tightly pressed contact during the crimping inwardly of the opposite side of the formed cylindrical ring to form a rounded indent in the fastener of the proper depth to grip, compress and seal the casing end and to form the desired tie.

The various objects of the invention will be clear from the description which follows and from the drawings, in which:

Fig. 1 is a perspective view of the ribbed initially U-shaped fastener employed in the tie.

Fig. 2 is a sectional view thereof as it appears at an intermediate stage of making the tie wherein it is bent into cylindrical form with the flat end edges in abutting relation.

Fig. 3 is a similar view thereof after the indenting step as made for a relatively large casing end.

Fig. 4 is a fragmentary elevational view of a machine adapted to apply the fastener and to make the tie.

Fig. 5 is a similar fragmentary view of the same showing the machine closed upon a casing end to compress said end preparatory to forming the tie.

Fig. 6 is a fragmentary vertical sectional view of the same on an enlarged scale taken between the ribs of the fastener and showing the fastener being loosely applied around the casing end.

Fig. 7 is a similar view showing the next step of forming the tie comprising shaping the fastener into a cylinder.

Fig. 8 is a similar view showing the fastener crimped to seal a casing of medium size and the casing substantially filling the space within the fastener.

Fig. 9 is a similar view showing the fastener deeply crimped to compress and seal a smaller casing end.

Fig. 10 is a perspective view of the completed tie showing the abutting flat end edges on the fastener and a looped string held thereby.

Fig. 11 is a similar view showing the crimped side and the cross shaped indent therein.

Fig. 12 is a vertical sectional view of the fastener.

In carrying out the invention, a preferably U-shaped ribbed sheet metal fastener 12 is employed. Since the fastener is an important part of the tie for the casing, it will be described in detail. The spaced apart legs 13 and 14 of the fastener diverge toward the respective end edges 15 and 16 thereof. Each of said edges is flat and lies in a plane perpendicular to both faces of its leg. The end portion 17 of each leg is bent toward the other leg to facilitate the bending of the fastener into cylindrical form as will later appear, said portions 17 being initially generally parallel. Both side edges 18 and 19 are rounded to avoid the presence of relatively sharp edges which might cut or press unduly into fragile casing material and start a cut or break which would destroy the usefulness of the casing.

The remainder of the fastener beyond the end portions 17 is reinforced and strengthened by means of the spaced apart parallel and longitudinally extending ribs 20, 21 pressed outwardly from the sheet material and substantially semi-circular in cross section. Each rib is spaced slightly away from the adjacent side edge and from the other rib to leave the strip 22 between the ribs undeformed. The ends 23 of the ribs are located just beyond the bends of the portions 17 and taper from a maximum height to a lesser height adjacent said portions. Hence said portions are free of ribs and offer less resistance to bending than the remaining ribbed portion of the fastener. Integrally joining the legs is the rounded or arcuate ribbed portion 24 preferably circular in outline and subtending an angle of slightly less than 180°. At said portion 24, the ribs insure the maintainance of the generally circular shape of said portion during the initial step in the application of the fastener to a casing end and until said portion is deliberately distorted under pressure. The width at said portion is somewhat less than at the portions 17 as best seen from Fig. 12 so that the side edges of the fastener converge upwardly.

As has been indicated, the fastener is used to tie the open end of a casing or stockinet or other suitable flexible container or to tie both ends if the container is of the tubular type. The resulting tie is universal in scope, being adapted for casings made of cellulose or other materials which are easily damaged, or of paper, cloth, polyethylene, fiber or any of the materials customarily used to hold such food products as fresh or smoked meats including hams, calas, Canadian bacon, or grease including lard, butter, margarine and the like, or poultry, cheese, fruits and vegetables.

The method employed for making the tie is first to pleat or twist or otherwise squeeze together the casing end portion to compress it in the usual manner to a size wherein the greatest dimension of its cross section is less than the width of the space between the legs of the fastener (Fig. 6) so that the fastener is free of the casing end and may be passed loosely thereabout. The fastener is then closed about the casing end by forming it into a ring of generally hollow cylindrical shape (Fig. 7). This is done by bending the portions 17 toward each other but in spaced relation to the casing end and pressing the flat end edges 15, 16 into firm abutting relation and out of contact with the compressed casing end. While the end edges are maintained in pressed contact with each other, the central area of the arcuate portion 24 between the ribs and opposite the end edges, is indented or crimped under considerable pressure to form a relatively deep rounded outwardly concave depression or indent of reverse curvature at said portion as well as a transverse indent completely across the fastener from one side edge to the other and across the ribs. Such deformation of the specified area brings the inner surface of the fastener including the inner circumferentially arranged inwardly convex surface of the rounded depression or indent, into such pressed sealing contact with the surface of the casing end as to form an adequate seal and dependable tie. The reverse curve reduces the cross sectional areas of the compressed casing end and of the space within the fastener until the casing and fastener so resist further reduction in area as to insure adequate sealing pressure. The same size fastener may be used for large and small casings, it being understood that for large casings, the indent is necessarily shallower. The fastener is firmly held during the indenting step to maintain the end edges in their abutting relation and to prevent separation thereof.

The tie may be made in the above manner with the aid of a suitable tool. As shown more or less diagrammatically in Figs. 4–9, the fixed anvil 30 is provided with a forming recess having an arcuate surface 31 and side surfaces 32 diverging therefrom. The anvil has vertical slots as 33 therein for the reception of the ribs 20, 21 of the fastener during the tying operation. Similar transversely spaced apart parallel fixed and thin side plates as 34 at the front and back of the machine project beyond the anvil (only one plate being shown at the back) and have arcuate notches 35 for the reception of the pleated or twisted casing end 36. Cooperating with and adapted to slide horizontally into overlapping relation to the fixed side plates 34, are the similar pair of side plates 37 each having a notch therein similar to the notch 35. In the retracted position of the plates 37, an opening 39 is provided by the notches, open at the top and closed at the bottom for the reception of the casing end 36 (Fig. 4). In the advanced or forward position of the plates 37 (Fig. 5) they overlap the plates 34 enough to substantially decrease the size of the opening 39 and to compress the casing in the notches along two spaced apart narrow circumferential bands into a generally oval shape.

The plates 37 are secured to a slide 40 having a horizontal groove therein in which slides the driver 41 which is separated by the spring 42 from the member 43 with which the driver is aligned. To the vertical extension 44 of the slide 40 is pivoted one end of the link 45, the other end of which is pivoted to the lever 46 which is in turn pivoted at 47 and carries the roller 48. As the compressed-air operated piston rod 49 is advanced toward the right out of the air cylinder 50, it engages and moves the roller 48, thereby rotating the lever 46 in a counter clockwise direction and moves the slide 44, 40 and the plates 37 carried thereby through the link 45 toward the left to compress the casing end in the opening 39 between the plates 34 and 37. As the piston rod passes the roller, the slide and plates 37 are locked in the advanced positions thereof, the lever being prevented from rotating clockwise. At the same time, the member 43 is also moved toward the left by the extension 44 and the adjustable screw 51 projecting horizontally from said member into contact with the slide. Consequently, the driver is also moved by said member through the intermediary of the spring 42 which is strong enough to insure the desired advance of the driver.

A fastener 12 having been inserted into the groove of the slide 40 in front of the driver, the fastener is moved by the driver toward the opening 39. Movement of the slide 40 is halted when the casing end 36 is sufficiently compressed (Fig. 5). However, forward movement of the driver 41 continues through the action of the second roller 52 on the piston rod. Said roller enters the radial slot 53 in the gear wheel 54 on the shaft 55, the wheel meshing with the rack 56 carried by the member 43. The gear wheel being rotated by the roller in a counter clockwise direction, the rack and the member are advanced relatively to the slide 40 to advance the driver 41, and to insert the fastener into the anvil and around the casing end as shown in Fig. 6.

It has been explained that the casing end is compressed to a size smaller than the space between the legs of the fastener. When the fastener enters the anvil, it therefore does not touch any part of the compressed casing end and cannot damage it in any way. The next step is to bend the fastener into ring form. This is done during the final part of the movement of the driver (Fig. 7). The bent portions 17 of the fastener are bent further toward each other on the further advance of the driver, by the sides 32 of the anvil slot, such bending being easily accomplished because of the lack of reinforcing ribs in said portions. When said portions reach the arcuate part 31 of the anvil slot and the ribs enter the slots 33, the bent portions 17 are bent into arcuate form corresponding to the portion 24, the ribbed portions of the legs also being bent until the flat end edges 15 and 16 are pressed together into firm contact throughout and the driver can advance no further owing to the resistance of the ribs and of the spring 42. In this position of the parts, while the casing end, which is in the opening 39, may be engaged by the continuous arcuate part 24 of the fastener and moved forwardly or to the left relatively to the opening 39, such movement is not long enough to interfere with the proper closing of the fastener or to permit the casing to be engaged or damaged by the fastener portions 17. The casing end is thereby loosely arranged within the ring-like fastener at this stage.

The final step in making the tie is to reduce the horizontal diameter of the ring-like fastener and the area enclosed thereby sufficiently to form an adequate seal without scratching, breaking or otherwise injuring the casing. This step is accomplished by the indenter 57 having a dull pointed or convexly rounded on tapered end 58 and reciprocating horizontally for a limited distance within the driver 41. As the piston rod continues to move toward the right after the fastener ring has been formed, the rack 56 and the member 43 to which the indenter is attached, move forwardly together with the indenter and the spring 42 is compressed. The indenter enters the space between the ribs 20 and 21 at the middle of the portion 24 and engages only the strip 22 opposite the end edges 15, 16, pressing with considerable force upon said strip. The force is great enough to form and indent 60 and to bend the entire middle part of said portion 24 inwardly including the adjacent parts of the ribs as shown in Figs. 3, 8, 9 and 11 without producing any sharp edges anywhere or pinching or mutilating the casing end in any way, the fastener assuming a kidney shaped form and the complete resulting indent being generally cross shaped. However, the cross sectional area of the space within the fastener, as well as of the casing end, is reduced as much or as little as is necessary to produce a perfect seal. In other words, the piston rod moves to advance the indenter until a predetermined pressure is put upon the fastener and the casing or the piston is halted by a suitable stop. The indenting of the fastener and compression of the casing continues until the required seal is attained, regardless of the thickness or diameter of the casing end within a wide range of sizes.

The indent directly formed by the indenter at the strip 22 is concave outwardly, deepest at its center and deeper than that formed indirectly at the ribs, the depth varying at different points and depending on the size and extent of the compressed casing end. At those sides of the ribs which face each other, the depth of the ribs is considerably increased by the indent. During the formation of the indent, the end edges are held in place against separation by the anvil. After the tie is released by the machine, the indent resists separation of said edges. The main arm 60 of the indent resists longitudinal movement of the fastener relatively to the casing and the cross arm of the indent resists rotation of the fastener on the casing. The entire inner surface of the crimped or indented fastener is smooth and rounded especially at the end edges, where the inner surface is uninterrupted by any projections or indentations.

It will now be seen that the invention functions to tie fragile and other casings without danger of damage thereto and in a wide range of casing sizes and materials, that the flat ends of the fastener producing the tie meet in pressed abutting relation without danger of opening up or pinching the casing end and that by first forming the fastener into a relatively large ring, the various advantages above pointed out can be attained and a dependable tie formed by later indenting the ribbed continuous and uninterrupted arcuate end of the fastener to the required extent.

While a certain specific form of the invention has herein been shown and described, various obvious changes may be made therein without departing from the spirit of the invention defined by the appended claims.

I claim:

1. A fastener for tying the end of a flexible food holding casing, said fastener being adapted to be indented into a kidney shaped form around the casing and adapted to present a smooth continuous and uninterrupted inner surface at the meeting end edges thereof, said fastener having a pair of legs joined integrally by an arcuate connecting portion and each terminating in a plane end edge, the end portion of each leg being bent inwardly from the remainder of the leg, the side edges of the fastener being convexly rounded and converging toward each other from the end edges of the legs toward the arcuate portion, and a pair of transversely spaced apart ribs of the thickness of the remainder of the fastener outstanding from the outer surface thereof and indented from the inner surface thereof and in slight transverse spaced relation to the adjacent rounded side edge, each of the ribs terminating in longitudinal spaced relation to the adjacent end edge and just beyond the bent portion to permit additional bending of the bent end portions, the ribs resisting separation of the plane end edges, said end edges being in pressed contact with each other and the fastener being closed, the ribs and the arcuate portion being indented by a cross shaped indent at an area opposite the end edges.

2. A casing tie comprising a flexible casing of non-metallic sheet material having a gathered and reduced end portion, and a one piece initially U-shaped fastener having a pair of legs joined by an arcuate connecting portion, a pair of parallel outstanding ribs extending circumferentially around the arcuate portion and into the legs and terminating in advance of the end edges of the legs, each of the ribs being arranged in transverse spaced relation to the other rib and to the adjacent side edge of the fastener, there being a narrow strip between the ribs extending throughout the lengths of the ribs, the fastener being in the form of a tightly closed ring around the reduced end portion of the casing, the strip at the connecting portion having an indent therein deepest at the mid-point thereof and having a bottom wall concave outwardly and increasing the depth of the inner sides of the ribs beyond the depth of the outer sides of the ribs, and extending circumferentially around the casing sufficiently to prevent longitudinal movement of the fastener along the casing end.

3. The method of applying a fastener to the end portion of a fragile flexible casing of thin sheet non-metallic material without injuring the casing and without pressure on the casing by any relatively sharp edges, the fastener being a U-shaped sheet metal fastener having a pair of legs joined by an outwardly convex arcuate connecting portion and provided with a pair of transversely spaced apart parallel outstanding ribs each extending along the legs and the arcuate portion and terminating at each end thereof at a point in longitudinal spaced relation to the adjacent end edge of the leg, the end edges being flat and perpendicular to the faces of the legs, said method comprising gathering and reducing the end portion of the casing to a preliminary compacted form smaller in size than the initial size thereof, compressing a pair of transversely spaced apart narrow circumferential bands of the reduced end portion to a still smaller size to complete the compacting of the end portion at and between the bands, said bands being spaced apart a distance greater than the width of the fastener to permit the fastener to be inserted therebetween, maintaining the compacted end portion of the casing in its compressed state against the tendency of said portion to expand toward the initial larger size thereof, passing the legs of the fastener around and out of contact with the casing between the bands, bending the legs into outwardly convex arcuate form until the end edges abut in tightly pressed relation and become coplanar to form the fastener into a closed ring with the bent legs spaced outwardly away from the casing, pressing directly and radially upon the relatively long and narrow circumferential area of the fastener at the arcuate connecting portion thereof and between the ribs to indent said narrow area longitudinally to varying depths concavely outwardly and part way across the width of the fastener, the pressure on said narrow area being sufficient to bend the fastener across the remainder of the width thereof at said arcuate portion and to bend the ribs at said arcuate portion to a lesser depth than the maximum depth of the indent at said area on the indenting of said area, relatively moving the casing and the arcuate connecting portion of the fastener by the indent-forming pressure on said fastener area until the casing is in pressed contact with the arcuate end portions of the legs to complete the casing tie, and finally releasing the aforesaid compressed bands to free the tie and the casing.

4. The method of making a tie on a fragile flexible casing of non-metallic sheet material comprising providing and applying to a gathered and reduced casing end, a U-shaped fastener having rounded side edges and plane end edges, by first compressing said already reduced end to a cross sectional area materially less than that of the space inside of the fastener and less than the initial cross sectional area of the reduced end, holding the compressed reduced end in a compressed state before the fastener is passed around said end, then passing the fastener around the thus held compressed end and out of contact therewith, bending the fastener into a ring with the plane end edges in pressed contact with each other throughout, crimping and indenting longitudinally of the fastener the middle area of the fastener diametrically opposite the contacting end edges to form an outwardly concave indent, having a depth greatest at the point opposite the end edges and least at the ends of the indent, and simultaneously indenting the fastener completely across the width thereof, the indenting continuing sufficiently to carry the fastener into tight sealing engagement with said compressed end and to form the fastener into a kidney shaped outline.

5. The method of making a tie on a flexible casing comprising applying to a reduced casing end a U-shaped fastener having plane end edges, compressing said reduced end, the fastener being passed around the compressed end and out of contact therewith, bending the fastener into a tightly closed ring with the plane end edges in pressed contact with each other throughout, the fastener having transversely spaced apart parallel ribs pressed outwardly and each terminating in spaced relation to the flat end edges, crimping and indenting the longitudinal middle strip between the ribs by applying pressure directly only to said strip until the ribs are indented and the longitudinal strip of the fastener between the ribs is indented to a greater depth than the indentation of the ribs.

6. The method of making a tie on the reduced end portion of a flexible transparent relatively fragile casing of sheet material adapted to hold food, comprising compressing said end to a predetermined cross sectional area and shape, holding said end in a compressed state, providing a U-shaped metallic fastener having flat end edges at the ends of the legs thereof, arranging the fastener loosely around the compressed end, forcing the end edges of the fastener into abutting relation while bending the fastener into cylindrical form around the compressed end and with the end out of contact with the end edge portions of the legs of the fastener, and simultaneously indenting the fastener longitudinally and transversely by forming a relatively long longitudinally arranged indent with a concave bottom at an area opposite the flat end edges to reduce the cross sectional area of the compressed end and of the inside of the fastener, making the indent deepest at its midpoint and sufficiently deep to put said end under adequate sealing pressure while maintaining the end edges in abutting relation and against separation.

7. A casing tie comprising the gathered and reduced end of a fragile flexible casing of non-metallic sheet material and a one-piece initially U-shaped fastener having a pair of spaced apart free end portions in generally parallel relation and each terminating in a flat edge perpendicular to the faces of the adjacent end portion, a leg extending away from each of the end portions, each leg converging from its end portion toward the other leg, an arcuate connecting part joining the legs, rounded edges on the legs and the arcuate portion, the flat end edges of the legs in the operative position of the tie being in pressed abutting contact with each other and forming a ring around the reduced portion of the casing, the arcuate portion being crimped and indented longitudinally and across the entire width thereof to form a cross shaped indent varying in depth along the longitudinal arm of the indent, the maximum depth of the indent being at the center of the indent and depending on the cross sectional area of the reduced casing portion.

8. The tie of claim 7, the fastener having a pair of parallel transversely spaced apart ribs outstanding from the outer surface thereof, the ribs terminating at each end at a point in longitudinal spaced relation to the adjacent flat end edge, the arcuate portion between the ribs being relatively deeply indented and having a bottom wall, the longitudinal center line of said wall being concave outwardly and being arranged in a plane parallel to the planes of the respective axes of the ribs, and the ribs adjacent the indented arcuate portion being indented to a lesser extent concavely outwardly than the arcuate portion.

9. A casing tie comprising a gathered and squeezed together end portion and a kidney shaped metallic fastener embracing said end portion smoothly and uninterruptedly and exerting sealing pressure thereon, said fastener having a pair of plane end edges in pressed contact throughout with each other and having a cross shaped indent therein opposite said end edges, the longitudinal center line of the bottom of the indent being concave and the indent being deepest at the center thereof, the transverse part of the indent extending completely across the fastener.

References Cited in the file of this patent

UNITED STATES PATENTS

| | | |
|---|---|---|
| 599,548 | Bosworth | Feb. 22, 1898 |
| 643,238 | Saeger | Feb. 13, 1900 |
| 1,234,640 | De Land | July 24, 1917 |
| 1,236,551 | Dillon | Aug. 14, 1917 |
| 1,670,347 | Gordon | May 22, 1928 |
| 2,347,713 | Rogoff | May 2, 1944 |
| 2,375,018 | Meyer et al. | May 1, 1945 |
| 2,735,149 | Frank | Feb. 21, 1956 |
| 2,759,256 | Bergan | Aug. 21, 1956 |

FOREIGN PATENTS

| | | |
|---|---|---|
| 434,243 | France | Nov. 20, 1911 |
| 477,419 | Canada | Oct. 2, 1951 |